United States Patent
Karuppaswamy et al.

(10) Patent No.: US 7,014,249 B2
(45) Date of Patent: Mar. 21, 2006

(54) IMPACT BEAM-INTEGRATED PELVIC PUSHER

(75) Inventors: Senthil N. Karuppaswamy, Rochester Hills, MI (US); Naveen Ramachandrappa, Sterling Heights, MI (US); Teodorico G. Terry, Rochester, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/916,120

(22) Filed: Aug. 11, 2004

(65) Prior Publication Data

US 2006/0033357 A1 Feb. 16, 2006

(51) Int. Cl.
*B60J 5/04* (2006.01)

(52) U.S. Cl. .............................. 296/146.6; 296/187.12

(58) Field of Classification Search ............. 296/146.6, 296/146.7, 187.12
See application file for complete search history.

(56) References Cited

U.S. PATENT DOCUMENTS

| 4,684,166 | A | | 8/1987 | Kanodia ................. 296/146.6 |
|---|---|---|---|---|
| 5,277,470 | A | | 1/1994 | Freeman et al. .......... 296/146.6 |
| 5,542,738 | A | * | 8/1996 | Walker et al. .......... 296/187.05 |
| 5,580,119 | A | * | 12/1996 | Uchida et al. ........... 296/146.6 |
| 5,588,692 | A | | 12/1996 | Gandhi et al. ........... 296/146.7 |
| 5,800,007 | A | | 9/1998 | Cho ........................ 296/146.6 |
| 5,865,496 | A | * | 2/1999 | Odan et al. .............. 296/146.6 |
| 6,631,940 | B1 | * | 10/2003 | Dauvergne et al. ...... 296/146.6 |
| 6,688,671 | B1 | * | 2/2004 | Fukutomi ................ 296/146.6 |
| 6,779,830 | B1 | * | 8/2004 | Patberg et al. ........... 296/146.6 |
| 2001/0017476 | A1 | * | 8/2001 | Nishikawa et al. ...... 296/146.6 |

* cited by examiner

*Primary Examiner*—Dennis H. Pedder
(74) *Attorney, Agent, or Firm*—Laura C. Hargitt

(57) ABSTRACT

A vehicle door structure includes an outer member, and an inner member spaced apart from the outer member and having structure forming an opening therein. An impact beam is affixed to the door structure and has a paddle member integrally formed therewith. The impact beam and the paddle member are laterally aligned with a compliant target through the opening in the inner member. Upon a lateral impact, the impact beam and paddle member move together toward the target, pushing the target inboard of the impact.

12 Claims, 2 Drawing Sheets

IMPACT BEAM-INTEGRATED PELVIC PUSHER

TECHNICAL FIELD

This invention relates to vehicle door structures.

BACKGROUND OF THE INVENTION

It is desirable to protect a vehicle occupant from an impacting barrier during a side impact event. Reducing the peak accelerations encountered by the occupant improves occupant performance. Because acceleration is inversely proportional to time, increasing the time during which the occupant is interacting with contacting elements may improve occupant performance. For instance, advancing the engagement of door trim (typically the most inboard component on a vehicle door) with the occupant ahead (i.e., inboard) of an impacting barrier (such as another vehicle) increases the time during which the occupant interacts with the impacted door. Additionally, a vehicle door may be equipped with energy-absorbing counter measures such as an impact beam and padding added to the trim panel.

SUMMARY OF THE INVENTION

A paddle member is integrally formed with and affixed to an impact beam in a vehicle door. The beam and the paddle member are in alignment with an opening in a rigid inner member of the door and with an energy-absorbing target member disposed adjacent to a trim panel member. During a lateral impact, the impact beam absorbs energy and, if the impacting force is great enough, deforms inward and moves together with the paddle member toward the target to push the target and trim panel member inboard of the impact. The trim panel thus interacts with the occupant earlier in the impact event than it would have had it not been pushed forward by the paddle member, thus potentially decreasing acceleration incurred by the occupant. Additionally, the trim panel member may move the occupant inboard, away from the impacting force. Besides advancing the trim panel, the target and the paddle member act to absorb some of the impact energy.

Accordingly, a vehicle door structure includes a generally rigid outer member (i.e., a door outer panel) and a generally rigid inner member (i.e., a door inner panel) spaced apart from the outer member. The inner member has structure forming an opening therein. An impact beam spans the door structure lengthwise and is rigidly affixed thereto. A compliant target is laterally aligned with the opening of the inner member. A paddle member is integrally formed with the impact beam and is laterally aligned with the target. A lateral impact on the door structure causes the impact beam and the paddle member to move together toward the target, pushing the target inboard of the impact.

In one aspect of the invention, a trim panel member may be spaced apart from the inner member opposite the outer member. The target may be mounted to an inboard face of the trim panel member such that it continuously abuts the trim panel member. Upon impact, the target may push the trim panel inboard of the impact.

In another aspect of the invention, the impact beam and the paddle member may be laterally aligned with the opening formed in the inner member such that, upon the impact, the impact beam and the paddle member move together toward the opening. Preferably, the target extends through the opening in the inner member.

In another aspect of the invention, an outboard face of the paddle member is juxtaposed with an inboard face of the outer member. The inboard face of the outer member has a contoured shape. The outboard face of the paddle member substantially follows the contoured shape of the inboard face. Preferably, only a gap for build tolerance remains between the paddle member and the outer member, helping to create a sufficiently continuous path between the outer member and the inner member, thus maximizing advancement of the trim panel.

In another aspect of the invention, the paddle member includes the bumper-engaging portion having an outboard face juxtaposed with an inboard face of the outer member and substantially following the contours of the inboard face. The paddle member includes a pusher portion connected to the bumper-engaging portion and disposed substantially inboard thereof. Preferably, the bumper-engaging portion is a steel plate that is integrally formed with the impact beam, and the pusher portion is a compliant foam material adhered to the steel plate; thus, the harder, bumper-engaging portion absorbs some impacting energy while the softer pusher portion is disposed inboard of the bumper-engaging portion.

In still a further aspect of the invention, the vehicle door structure includes a substantially vertical window glass drop rail disposed between the target and the paddle member. The glass drop rail is formed with a weakened area such that, upon a lateral impact, the glass drop rail fractures at the weakened area, allowing the impact beam and the paddle member to push the target inboard of the impact.

A door for a vehicle includes a rigid outer member and a trim panel member spaced apart from the outer member to form a cavity spanning laterally therebetween. An impact beam is rigidly affixed to the door and is disposed lengthwise between the trim panel member and the outer member through the cavity. A paddle member is integrally formed with the impact beam to extend therefrom in the cavity. A compliant target is mounted to the trim panel member and disposed in the cavity in alignment with the paddle member. The impact beam, the paddle member and the target form a sufficiently continuous, energy-absorbing, lateral path across the cavity from the outer member to the trim panel member such that a lateral impact upon the outer member is at least partially absorbed by the impact beam, and the paddle member pushes the target and the trim panel member inboard of the impact.

In another aspect of the invention, the compliant target is mounted to and continuously abuts an inboard face of the trim panel member to further define the sufficiently continuous lateral path. The paddle member has an outboard face that is juxtaposed with an inboard face of the outer member. The inboard face of the outer member has a contoured shape which the outboard face of the paddle member substantially follows.

In another aspect of the invention, the compliant target and the paddle member sufficiently continuously abut one another to further define the sufficiently continuous lateral path. By maximizing the continuity of the lateral path formed by the outer member, the paddle member, the target and the trim panel, the interaction time of the trim panel with an occupant is also maximized.

In yet another aspect of the invention, a glass drop rail is vertically disposed in the door through the cavity. The glass drop rail is formed with a weakened area. Upon the lateral impact, the glass drop rail fractures at the weakened area to allow the impact beam and the paddle member to push the target inboard of the impact.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
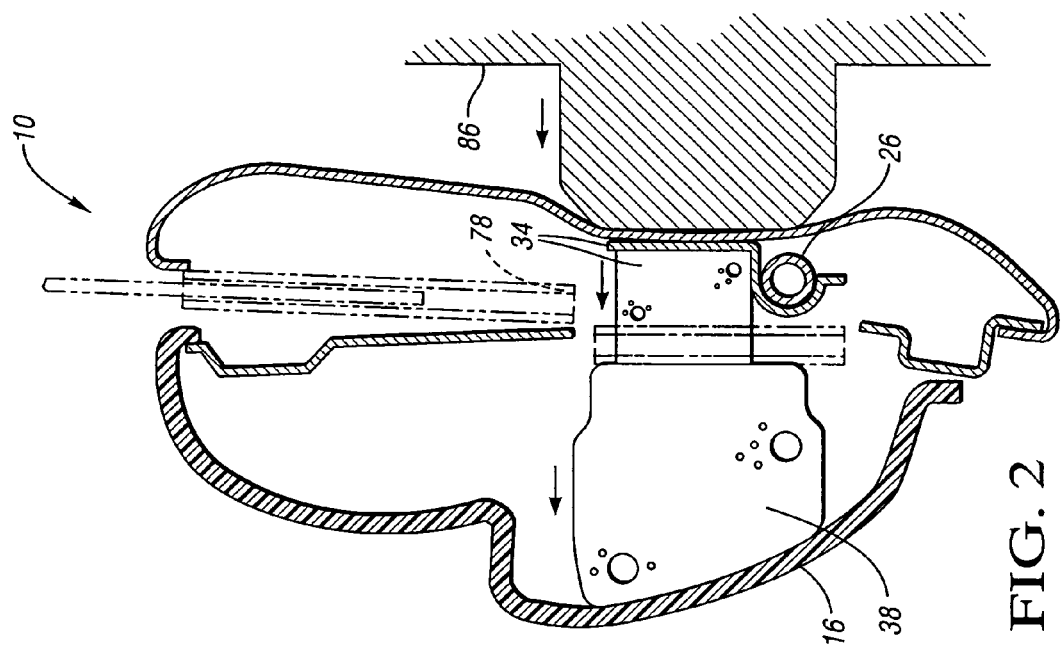
FIG. 1 is a schematic cross-sectional view of a door having an impact beam-mounted paddle member, in accordance with the invention.

Referring to FIG. 1, a vehicle door 10 (also referred to as door structure) has an outer member 12, an inner member 14 and a trim panel member 16. As is known to those skilled in the art, the outer member 12 and inner member 14 are generally rigid and are affixed to one another around edges thereof (not shown). The trim panel member 16 is mounted to the inner member 14. The inner member 14 is formed with an opening 18. A cavity 22 is thus formed between the trim panel member 16 and the outer member 12 through the opening 18 in the inner member 14.

Figure 3:
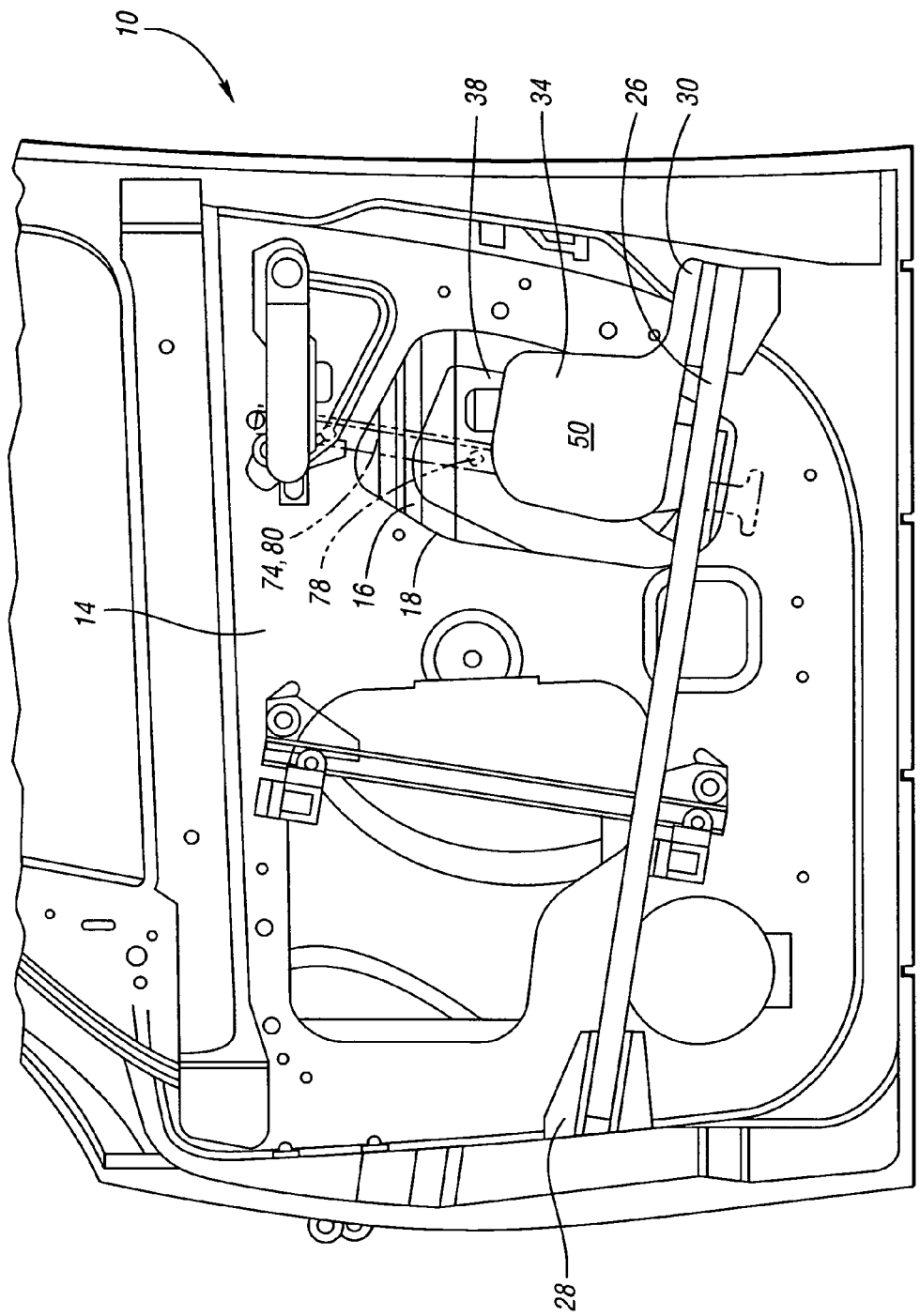
FIG. 3 is a schematic plan view of the door of FIG. 1.

Referring to FIG. 3, an impact beam 26 is disposed lengthwise across the door 10. The impact beam 26 includes first and second flange members, also referred to as flanged ends 28, 30, respectively, which are rigidly affixed to the door 10. A paddle member 34 is integrally formed with the beam 26. Specifically, the paddle member is integrally formed with the second flanged end 30 and is welded or otherwise affixed to the impact beam 26 such that the paddle member 34 extends generally thereabove. By integrally forming the paddle member 34 with the flanged end 30 of the impact beam 26, the structural integrity of the paddle member 34 is increased, and the paddle member 34 and impact beam 26 are able to move together as a functional unit.

The impact beam 26 and the paddle member 34 are aligned with the opening 18 in the inner member 14. Furthermore, the impact beam 26 and paddle member 34 are aligned with a target 38, which is aligned with and visible through the opening 18 in the inner member.

Referring again to FIG. 1, the impact beam 26 and the integrally formed paddle member 34 are shown aligned with the target 38 through the opening 18. The paddle member 34 includes a bumper-engaging portion 42 and a pusher portion 46. The pusher portion 46 is connected to the bumper-engaging portion 42 and is disposed inboard thereof, extending toward the target 38. Preferably, the bumper-engaging portion 42 is a steel plate that is integrally formed with the impact beam 26 as discussed with respect to FIG. 3. The pusher portion 46 is preferably a compliant foam material which is adhered to or otherwise affixed to the bumper-engaging portion 42. Preferably, the bumper-engaging portion 42 has an outboard face 50 which is juxtaposed with an inboard face 54 of the outer member 12 and substantially follows the contoured shape of the inboard face 54.

Preferably, the compliant target 38 is also a foam material. The compliant target 38 extends through the opening 18 in the inner member 14. The compliant target 38 is disposed in the cavity 22 and is aligned with the paddle member 34. Preferably, the inboard face 58 of the target member 38 substantially continuously follows the contours of an outboard face 62 of the trim panel member 16. In fact, the inboard face of the target member 38 may be adhered to or integrally formed with the outboard face 62 of the trim panel member.

By aligning the impact beam 26, the paddle member 34 and the target 38 and by juxtaposing the faces 62, 58 of the trim panel member 16 and the target member 38 and the faces 50, 54 of bumper-engaging portion 42 and the outer member 12, respectively, the impact beam 26, the paddle member 34 and the target 38 form a sufficiently continuous (i.e., sufficiently to maximize advancement of the target inboard in a minimal amount of time), energy-absorbing lateral path across the cavity 22 from the outer member 12 to the trim panel member 16. The impact upon the outer member 12 is at least partially absorbed by the impact beam 26, the paddle member 34 and the target member 38 across the so-formed lateral path.

In one embodiment of the invention, the compliant target 38 and the pusher portion 46 of the paddle member 34 substantially continuously abut one another at an outboard face 66 of the target 38 and an inboard face 70A of the pusher portion 46. In some vehicle doors, however, a glass drop rail 74 (shown in phantom) is disposed vertically in the door 10 and extends through the cavity 22 between the target 38 and the pusher member 46. The foam pusher portion 46 may be formed with a cutout portion (not shown) shaped to partially surround the glass drop rail 74 such that the portion of the pusher portion 46 that does not abut the glass drop rail 74 forms the inboard face 70A which abuts the outboard face 66 of the target 38; the portion of the pusher portion 46 which abuts an outboard face 76 of the glass drop rail 74 has an inboard face 70B (i.e., the cutout is such that the pusher portion extends inboard only to the outer face 76 of the glass drop rail 74 where it abuts the glass drop rail 74, but otherwise extends further inboard to the target 38).

The glass drop rail 74 is formed with a weakened area 78. The weakened area 78 may be a stamped or cut hole in a wall 80 of the glass drop rail 74, as may be better viewed in FIG. 3. Alternatively, the invention contemplates other means of forming a weakened area 78, such as forming a notched or thinned area in the wall 80 of the glass drop rail 74.

In some vehicle doors, whether or not there is a glass drop rail 74 disposed between the target 38 and the pusher portion 46, it may be necessary to maintain a clearance or gap (not shown) between the target 38 and the pusher portion 46 just sufficient that window glass 82 may extend therebetween. In such a case, the gap would be sufficiently small between the outboard face 66 of the target member 38 and the inboard face 70A of the pusher portion 46 so as to maximize the continuity of the energy-absorbing lateral path such that the target member 38 would be pushed inboard of the impact in a minimal amount of time.

Figure 2:
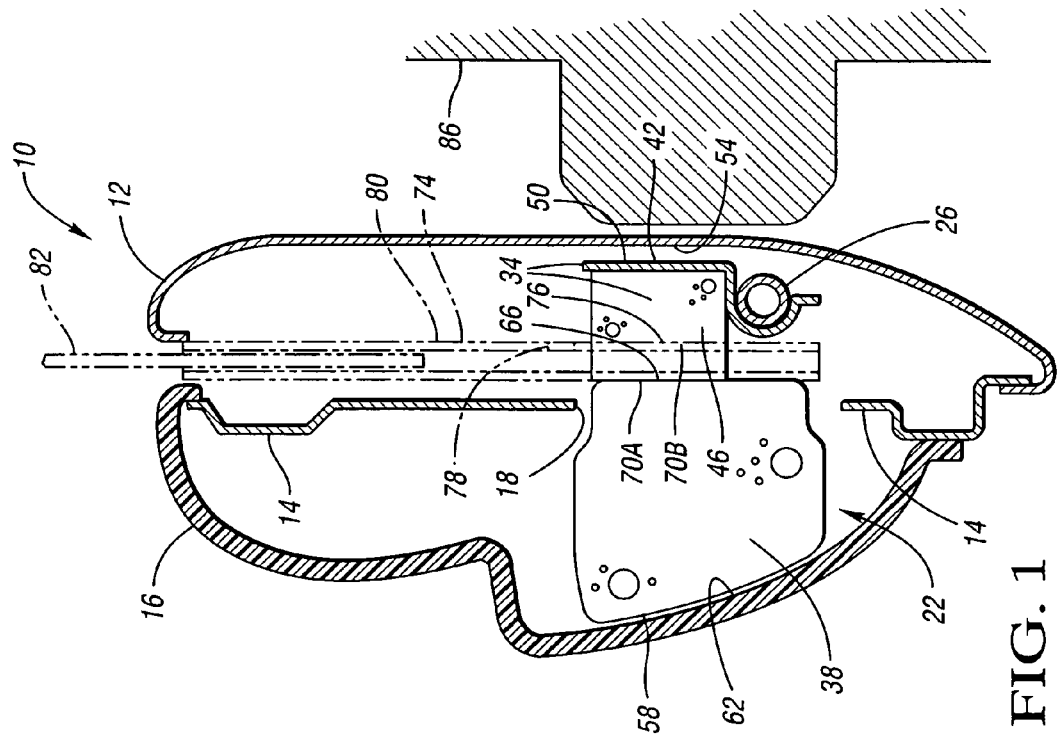
FIG. 2 is a schematic cross-sectional view of the door of FIG. 1 upon a lateral impact.

The impact beam 26, the paddle member 34 and the target 38, as well as the opening 18 in the inner member 14, are purposefully aligned with a likely positioning of an impacting member 86. Thus, as is shown in FIG. 2, when the impacting member 86 impacts the outer member 12, the impact beam 26 and the paddle member 34 move together toward the target 38 pushing the target 38 away from the impact member 86. If glass drop rail 74 is disposed between the target 38 and the paddle member 34, the glass drop rail 74 will break at the weakened area 78 upon the impact. Thus, the breakage of the glass drop rail 74 allows the impact beam 26 and paddle member 34 to push the target 38 inboard. The target 38 and trim panel member 16 are thus pushed inboard of the impact. This permits earlier contact of the trim panel member 16 with an occupant positioned inboard of the trim panel member 16. Preferably, a pelvic portion of such an occupant is positioned in alignment with the target 38. Accordingly, earlier contact of the trim panel 16 with the pelvic region of the occupant increases the time during which the occupant is interacting with the trim panel member 16. Because lateral accelerations encountered by the occupant due to contact with the trim panel member 16 are equivalent to the rate of velocity change over the time during which the trim panel 16 is in contact with the occupant, an increase in contact time reduces the peak acceleration, thus improving occupant performance. Additionally, movement of the target 38 and trim panel 16 ahead of the impacting member 86 helps to move an occupant inboard, away from the impact member 86.

While the best modes for carrying out the invention have been described in detail, those familiar with the art to which this invention relates will recognize various alternative designs and embodiments for practicing the invention within the scope of the appended claims.

What is claimed is:

1. A vehicle door structure comprising:
   a generally rigid outer member;
   a generally rigid inner member spaced apart from said outer member and having structure forming an opening therein;
   an impact beam generally spanning the door structure lengthwise and rigidly affixed thereto;
   a compliant target laterally aligned with said opening in said inner member;
   a paddle member integrally formed with said impact beam and laterally aligned with said target; and
   wherein a lateral impact on the door structure causes said impact beam and said paddle member to move together toward said target, pushing said target inboard of the impact; and
   a substantially vertical window glass drop rail disposed between said target and said paddle member;
   wherein said glass drop rail is formed with a weakened area such that, upon the impact, said glass drop rail fractures at said weakened area to allow said impact beam and said paddle member to push said target inboard of the impact.

2. The vehicle door structure of claim 1, wherein said impact beam and said paddle member are laterally aligned with said opening formed in said inner member such that, upon the impact, said impact beam and said paddle member move together toward said opening.

3. The vehicle door structure of claim 1, further comprising:
   a trim panel member spaced apart from said inner member opposite said outer member;
   wherein said target is mounted to an inboard face of said trim panel member and continuously abuts said inboard face of said turn panel member.

4. The vehicle door structure of claim 3, wherein said pushing on said target thereby pushes said trim panel inboard of the impact.

5. The vehicle door structure of claim 1, wherein said impact beam includes a flange member, wherein said impact beam is rigidly affixed to the door structure at said flange member, and wherein said paddle member is integrally formed with said flange member.

6. The vehicle door structure of claim 1, wherein an outboard face of said paddle member is juxtaposed with an inboard face of said outer member, wherein said inboard face has a contoured shape, and wherein said outboard face substantially follows the contoured shape of said inboard face.

7. The vehicle door structure of claim 1, wherein said paddle member includes a bumper-engaging portion having an outboard face juxtaposed with an inboard face of said outer member wherein said inboard face has a contoured shape, wherein said outboard face substantially follows the contoured shape of said inboard face; and
   wherein said paddle member includes a pusher portion connected to said bumper-engaging portion and disposed sufficiently inboard thereof such that said pusher portion extends toward said target.

8. The vehicle door structure of claim 7, wherein said bumper-engaging portion is a steel plate integrally formed with said impact beam; and
   wherein said pusher portion is a compliant foam material adhered to said steel plate.

9. The vehicle door structure of claim 1, wherein said target extends through said opening in said inner member toward said paddle member.

10. A door for a vehicle comprising:
    a rigid outer member;
    a trim panel member spaced apart from the outer member to form a cavity spanning laterally therebetween;
    an impact beam rigidly affixed to the door and disposed lengthwise between said trim panel member and said outer member through said cavity;
    a paddle member integrally formed with said impact beam to extend therefrom in said cavity;
    a compliant target mounted to said trim panel member and disposed in said cavity in alignment with said paddle member;
    a glass drop rail vertically disposed in the door through said cavity;
    wherein said glass drop rail is formed with a weakened area; and
    wherein upon the impact, said glass drop rail fractures at said weakened area to allow said impact beam and said paddle member to push said target inboard of the impact;
    wherein said impact beam, said paddle member and said target form a sufficiently continuous, energy-absorbing lateral path across said cavity from said outer member to said trim panel member such that a lateral impact upon said outer member is at least partially absorbed by said impact beam, and said paddle member pushes said target and said trim panel member inboard of the impact.

11. The door of claim 10, wherein the compliant target is mounted to an inboard face of said trim panel member and continuously abuts said inboard face of said trim panel member to further define the sufficiently continuous lateral path;
    wherein the paddle member has an outboard face juxtaposed with an inboard face of said outer member;
    wherein said inboard face of said outer member has a contoured shape; and
    wherein said outboard face of said paddle member substantially follows the contoured shape of said inboard face of said outer member to further define the sufficiently continuous lateral path.

12. The door of claim 10, wherein said compliant target and said paddle member sufficiently continuously abut one another to further define the sufficiently continuous lateral path.

* * * * *